March 23, 1965  R. W. RANZAU  3,174,555
PULVERIZING ATTACHMENT FOR PLOWS
Filed May 20, 1963
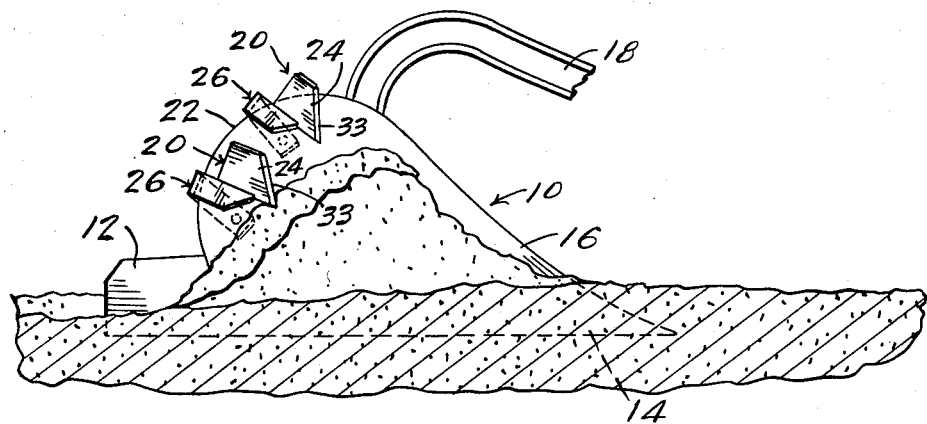
FIG-1-
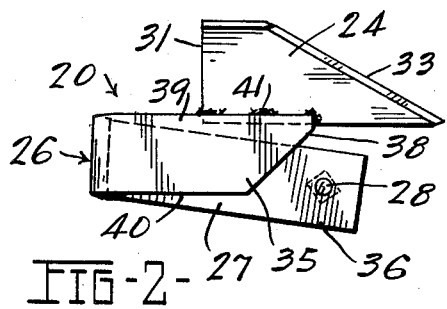
FIG-2-
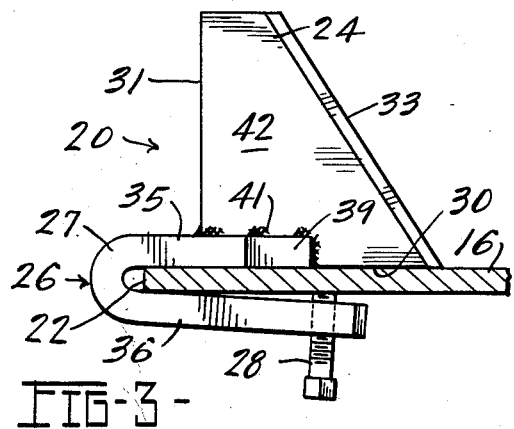
FIG-3-
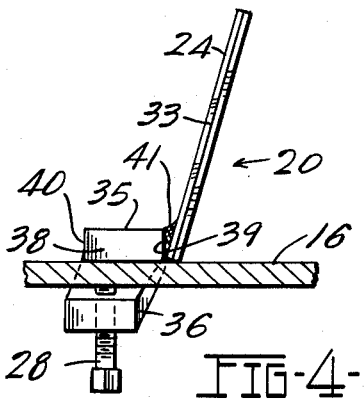
FIG-4-
INVENTOR:
RICHARD W. RANZAU.
BY
ATT'Y.

United States Patent Office 3,174,555
Patented Mar. 23, 1965

3,174,555
PULVERIZING ATTACHMENT FOR PLOWS
Richard W. Ranzau, Ridgeville Corners, Ohio
Filed May 20, 1963, Ser. No. 281,539
1 Claim. (Cl. 172—203)

This invention relates to pulverizing attachments for plows and is particularly directed to blade means that may be adjustably secured to the moldboard of a plow for cutting or dividing the slice of soil turned up by the plow.

An object of the present invention is to provide an attachment for plows that is highly efficient in operation, economical to produce, easily attached and adjusted and improves the performance of the plow.

Another object of the invention is to provide the blade of the attachment with an attaching clamp for adjustably positioning the blade with respect to the moldboard to secure the desired cut and pulverizing action and retain the blade in adjusted position.

Another object of the invention is to provide a blade and clamp assembly that is self-cleaning and thereby produces a smooth and even surface to the plowed soil.

Generally speaking, the attachment of the present invention includes a generally triangular or trapezoidal blade welded at an inclined angle to an edge of one leg of a U-shaped clamp so that the cutting edge of the blade projects outwardly from the moldboard of the plow with the bight of the clamp in engagement with the curved edge of the moldboard. The legs of the clamp are spread laterally to dispose the blade at an angle to the edge of the moldboard, the longer rear leg having a threaded aperture for receiving a clamping bolt and the front leg having a diagonal bottom end which together with the angularity of the blade provide a self-cleaning attachment.

The above mentioned and other features and objects of this invention and the manner of attaining them will become more apparent and the invention itself will be understood best by reference to the following description of an embodiment of the invention taken in conjunction with the accompanying drawing, wherein:

FIG. 1 is a side elevation of a moldboard plow with which the pulverizing attachment has been incorporated and showing two such attachments in different positions of adjustment;

FIG. 2 is a front view of one of the attachments shown in FIG. 1;

FIG. 3 is a side view of the attachment shown in FIG. 2 showing the means by which it is secured to the edge of a moldboard; and FIG. 4 is a bottom or right hand view of the device shown in FIG. 3 and illustrating the angularity of the blade with respect to the face of the moldboard.

Referring to the drawings, the attachment of the present invention may be used with all types of moldboard plows, one being shown in FIG. 1 at 10 as including a landside 12, share 14, moldboard 16 and beam 18.

When soil conditions are ideal, plow 10 will turn the soil over and as it falls the soil will tend to break up or pulverize and require a minimum of harrowing to produce a level seed bed. However, ideal soil conditions are seldom realized, particularly in heavy soil, with the result that after plowing with the ordinary plow, considerable harrowing and rolling is required to break up the clods and reduce the soil to desired fineness.

To overcome these difficulties and increase the utility of the moldboard plow as well as eliminate much of the harrowing now required, one or more pulverizing attachments of the present invention, indicated generally at 20, may be secured to the upper curved edge 22 of the moldboard 16 as in FIG. 1.

The attachment 20 comprises a blade portion 24 and a clamp portion 26 including a U-shaped member 27 and a clamping bolt 28. The blade 24 is of generally right triangular or trapezoidal shape (FIG. 3) having perpendicular edges 30 and 31 and a diagonal or angular sharpened cutting edge 33 along the hypotenuse of long edge of the blade, which is also the leading edge when secured to the plow by clamp portion 26.

The U-shaped member 27 of clamp portion 26 has a shorter leg 35 and a longer leg 36, leg 35 having a diagonal bottom end 38 providing a long side edge 39 and a short side edge 40. The blade 24 is welded at 41 to edge 39 of leg 35 so that the plane of the blade 24 projects from the leg 35 at an acute angle to edge 39 or an obtuse angle to the outer surface of leg 35 as particularly shown in FIG. 4. A comparatively small portion of the front face 42 adjacent the back edge 30 of the blade 24 is secured to leg 35, so that maximum blade area is projected outwardly from the moldboard 16 when unit 20 is clamped thereto.

Legs 35 and 36 may also be spread laterally as shown in FIG. 2 to dispose blade 24 slightly angularly with respect to leg 36 as well as the edge 22 of the moldboard 16. This angularity may be varied by rocking the clamp 26 so that there is more or less contact between the bight of the U-shaped member 27 and the edge 22 of the moldboard. Accordingly, the angle at which the cutting edge 33 engages the slice of soil may be preset to secure the desired cutting and pulverizing action.

When hooked over the edge 22 of the moldboard 16 and with blade 24 in desired position, the clamp 26 is secured by tightening locking bolt 28. This positions the back edge 30 of the blade 24 in engagement with the front surface of the moldboard 16 and at the proper angle thereto for most effective slicing of the soil without accumulation thereof by the attachment. This arrangement is thus self-cleaning and creates the minimum of resistance and therefore does not add to the load of the plow. The bevel 38 on the bottom end of the leg 35 to which the blade 24 is attached has been found to further enhance this self-cleaning feature, as has the angularity of blade 24 with respect to the leg 35.

While there is described above the principles of this invention in connection with specific apparatus, it is to be clearly understood that this description is made only by way of example and not as a limitation to the scope of this invention.

What is claimed is:

A soil slicing attachment for a moldboard plow comprising:
(A) an offset U-shaped clamp member having
  (a) one leg longer than the other,
  (b) the long leg having a threaded hole therein, and
  (c) the short leg having a bevelled end providing a short side edge and a long side edge,
(B) a trapezoidal slicing blade, (a) welded at an acute angle to the long side edge of said short leg, and
(b) having an angular cutting edge projecting beyond the end of said short leg, and (C) a clamping bolt threaded into said hole
(a) for clamping said short leg and an edge of said blade against the face of the moldboard, and
(b) for adjustably securing said attachment to the plow with the bight of said U-clamp in engagement with the trailing edge of the moldboard to position the plane of said blade at a predetermined angle with respect to said trailing edge.

References Cited in the file of this patent

UNITED STATES PATENTS

| | | |
|---|---|---|
| 1,004,803 | McDaniel | Oct. 3, 1911 |
| 1,890,261 | Miller | Dec. 6, 1932 |

FOREIGN PATENTS

| | | |
|---|---|---|
| 604,866 | Great Britain | July 12, 1948 |
| 447,057 | Italy | Apr. 10, 1949 |